United States Patent [19]
Morimoto et al.

[11] Patent Number: 4,850,686
[45] Date of Patent: Jul. 25, 1989

[54] APPARATUS FOR ADJUSTING LIGHT BEAM DIRECTION

[75] Inventors: Akira Morimoto; Taizo Saito; Takehiro Nakatsue, all of Tokyo, Japan

[73] Assignee: Asahi Kogaku Kogyo K.K., Tokyo, Japan

[21] Appl. No.: 152,027

[22] Filed: Feb. 3, 1988

[30] Foreign Application Priority Data

Feb. 6, 1987 [JP] Japan ................................. 62-26125
Feb. 25, 1987 [JP] Japan ................................. 62-42199
May 1, 1987 [JP] Japan ................................. 62-109165

[51] Int. Cl.$^4$ .......................... G02B 26/00; G02B 5/04
[52] U.S. Cl. ..................................... 350/484; 350/6.4; 350/286
[58] Field of Search .......................... 350/484, 6.4, 286

[56] References Cited

U.S. PATENT DOCUMENTS 3,378,687  4/1968  Schepler ............................. 250/236
4,515,447  5/1985  Weimer et al. ....................... 350/6.4

FOREIGN PATENT DOCUMENTS 0566810  10/1958  Belgium ............................. 350/286
61-252523  11/1986  Japan .

Primary Examiner—Rodney B. Bovernick
Assistant Examiner—Rebecca D. Gass
Attorney, Agent, or Firm—Sandler & Greenblum

[57] ABSTRACT

An apparatus for adjusting light beam direction comprises, for instance, two prisms, i.e., a first and a second prisms arranged, in order, along an incident direction of light beam; an incident face of the first prism being parallel to a plane which is assumed to rotate an imaginary vertical plane perpendicular to the incident direction around a rotational axis by a first acute angle; an outgoing face of the first prism being parallel to a plane which is assumed to rotate the vertical plane around the axis by a second acute angle larger than the first one in the same direction as the latter; an incident face of the second prism being parallel to the outgoing face of the first prism and an outgoing face of the second prism being parallel to the incident face of the first prism, at the zero-adjusting state; and at least one of these prisms being able to adjustably rotate around the rotational axis. The apparatus may be incorporated into a scanning optical apparatus and makes it possible to make the incident and outgoing light beams parallel to one another and to restrict, to a low level or even to zero, the shift therebetween.

18 Claims, 14 Drawing Sheets

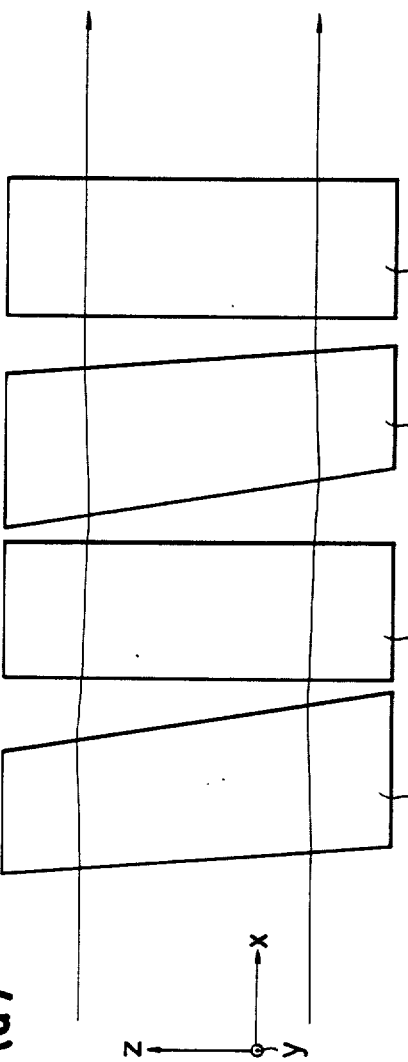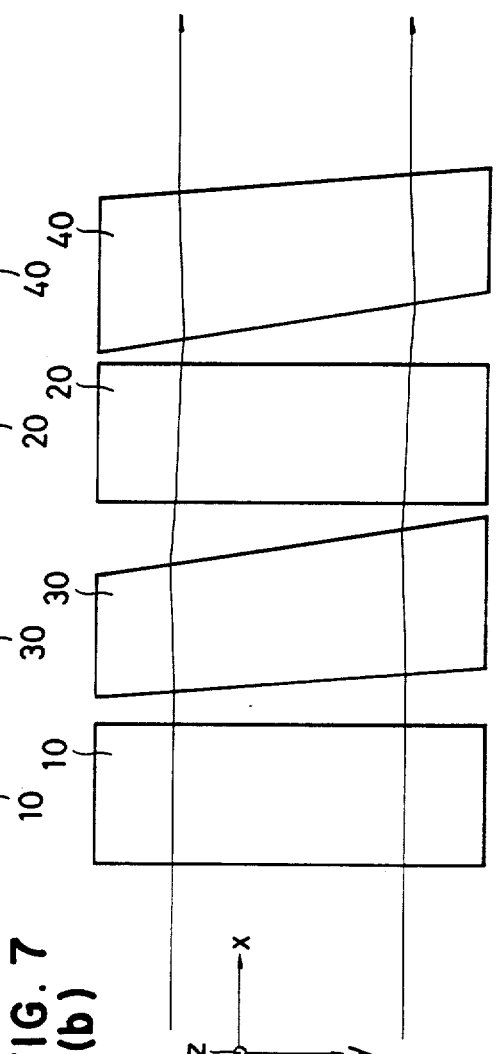
FIG. 7 (a)
FIG. 7 (b)

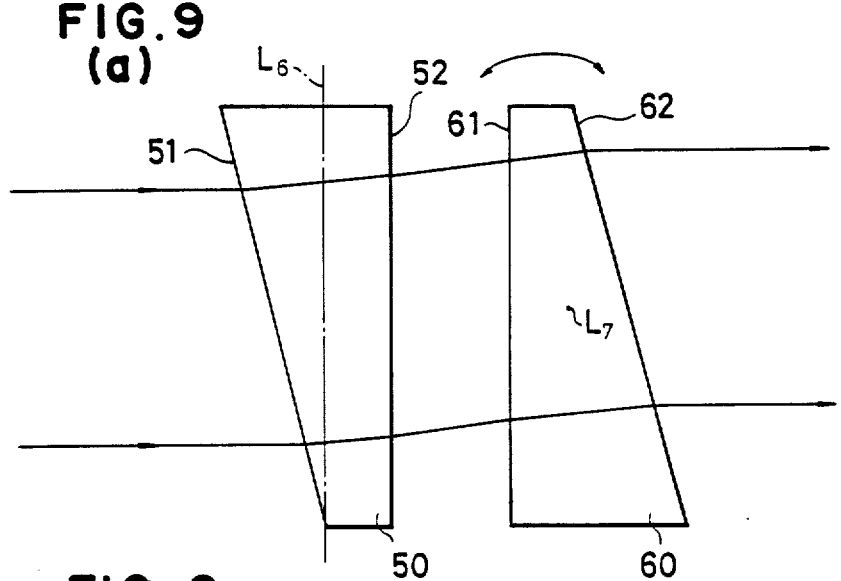
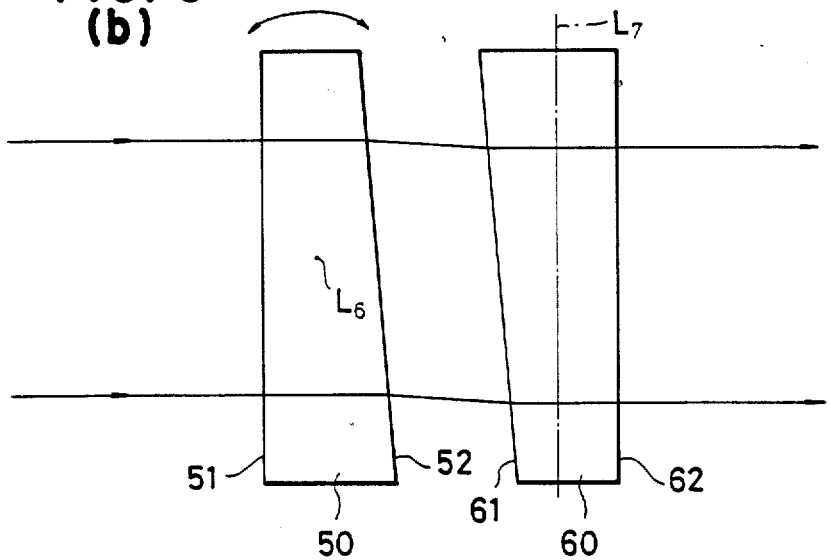

APPARATUS FOR ADJUSTING LIGHT BEAM DIRECTION

BACKGROUND OF THE INVENTION

1. Field of the Invention

The present invention relates to an apparatus for adjusting light beam direction of progress by making use of the relation between the incident angle and the deviation angle of a prism.

2. Prior Art

The angle between the incident ray and the outgoing ray observed when monochromatic ray of light pass through a prism is regarded as deviation angle. The deviation angle becomes minimum when the incident angle is equal to the outgoing angle and, in an area around the minimum value, the rate of change in the deviation angle with respect to the variation of incident angle is low.

As shown in FIG. 13, a prism having an apex angle of $\omega$ is disposed so that rays of light strike the incident face of the prism perpendicularly. If this prism is rotated clockwise or counterclockwise in the figure, the relation between the rotational angle $\theta$ of the prism (in FIG. 13, the clockwise direction is designated "+" and the counterclockwise direction is designated "−") and the deviation angle $\theta'$ behaves as shown in FIG. 14. In FIG. 14, the relation for $\omega = 10°$ is plotted by a continuous line and that for $\omega = 5°$ is plotted by a broken line.

The smaller the apex angle, the lower the rate of change in the deviation angle and the rate of change is extremely lowered particularly in the vicinity of the minimum angle of deviation denoted in FIG. 14 by arrows. By making use of such characteristics, the angle of the outgoing rays can be changed in a minute level while adjusting the incident angle of rays of light with respect to the prism in relatively large level.

However, if such an adjustment is effected using a single prism, there is necessarily formed an angle deference between the incident rays and the outgoing rays irrespective of the angle between the incident rays and the prism For this reason, the cross-sectional shape of incident light beam differs from that of outgoing light beam. Moreover if light of which wave length distribution extends over a wide range, such as white light is used as an incident light, the chromatic aberration cannot also be neglected. Therefore, such adjustment cannot be employed in certain applications.

These problems can be solved by using an apparatus for adjusting light beam direction shown in FIG. 15, in which two prisms are utilized.

As shown in FIG. 15, the incident faces and the outgoing faces of prisms 1 and 2 constituting the apparatus are parallel with an axis which is perpendicular to the incident direction of light beam. In this apparatus, the direction of outgoing light beam is changed by rotating the prism 1 around a rotational axis $L_1$ parallel to the axis, in accordance with the aforementioned relation between the incident angle and the deviation angle. According to the apparatus having the construction shown in FIG. 15, it is possible to attain a state in which the angle difference between the incident light beam and the outgoing light beam is zero (this state is defined as "zero-adjusting state") and in such case, the alternation of the cross-sectional shape and the chromatic aberration can be eliminated. However, since the incident light beam and the outgoing light beam cause a shift therebetween even if the incident and outgoing light beam are parallel to each other, it is quite difficult to properly arrange optical systems at the incident side and the outgoing side of the prisms.

One example of an apparatus for 2-dimensionally adjusting light beam direction utilizing two prisms is shown in FIGS. 16–18.

As seen from these figures, the apparatus is provided with two prisms 3 and 4. The prism 3 is designed to be able to rotate around a rotational axis $L_2$ parallel to an axis z while the prism 4 is designed to be able to rotate around a rotational axis $L_3$ parallel to an axis y. This apparatus makes it possible to 2-dimensionally effect fine adjustment of the angle of outgoing rays by controlling the rotational angle of the prisms 3 and 4. In this connection, FIGS. 17 and 18 are diagrams illustrating how the prisms shown in FIG. 16 refract rays of light. FIG. 17 is a sectional view taken along a plane passing through the center of the prisms and parallel to x-y plane and FIG. 18 is a sectional view taken along a plane passing through the center of the prisms and parallel to x-z plane.

However, if the apparatus shown in FIG. 16 is used, it is also impossible to solve the problems of the formation of the angle difference and the chromatic aberration in each direction, as in the apparatus shown in FIG. 13 in which a single prism is employed.

SUMMARY OF THE INVENTION

Accordingly, it is a principal purpose of the present invention to provide an apparatus for adjusting light beam direction, which makes it possible to make the incident and outgoing light beams parallel with one another and which further makes it possible to restrict, to a small level or even to zero, the shift between the incident and outgoing light beams in a parallel condition.

The aforementioned and other purposes according to the present invention can effectively be achieved by providing an apparatus for adjusting light beam direction. The construction thereof is as follows.

First of all, if it is intended to one dimensionally adjust the light beam direction, two prisms are used. These prisms are arranged, in order, along the direction of progress of the incident light beam. When assuming a imaginary virtual plane which is perpendicular to a direction of incident light beam, the incident face of one prism is parallel to a plane which is assumed by rotating the vertical plane around a rotational axis parallel to the vertical plane by first acute angle, and the outgoing face thereof is parallel to a plane which is assumed by rotating the vertical plane in the same direction as the first acute angle around the rotational axis by second acute angle which is larger than the first one. In the zero-adjusting state, the incident face of the other prism is parallel to the outgoing face of the first prism and the outgoing face thereof is parallel to the incident face of the first prism. At least one of these two prisms is designed so as to be able to adjustably rotate around a rotational axis parallel to the foregoing axis.

As a means for two dimensionally adjusting light beam direction, the following two constructions are possible.

The first such apparatus comprises a first group of prisms consisting of two prisms arranged in the same manner as in the aforementioned apparatus for one dimensionally adjusting light beam direction and a second group of prisms consisting of two other prisms arranged in the same manner as the first prisms. These two groups of prisms are arranged so that the rotational axes thereof are perpendicular to one another.

The second such apparatus comprises two prisms having shapes different from those mentioned above. The first prism is designed to be able to rotate around a first rotational axis perpendicular to the incident direction of light beam, while the second prism is designed to be able to rotate around the second rotational axis perpendicular to both the incident direction and the first rotational axis. In the zero adjusting state, these two prisms are disposed so that the incident face of one prism is parallel to the outgoing face of the other prism and that two virtual intersectional lines formed when the incident face and the outgoing face of each prism are extended are non-parallel with respect to both the first and the second rotational axes.

BRIEF DESCRIPTION OF THE DRAWINGS

The apparatus for adjusting light beam direction according to the present invention will hereunder be explained in more detail with reference to the attached drawings, in which

FIGS. 7 (a) and 7 (b) are diagrams similar to FIG. 6 and illustrating light path refracted by variations of prism-arrangement;

FIGS. 9 (a) and 9 (b) are diagrams showing light path refracted by the apparatus for adjusting light beam direction shown in FIG. 8;

DETAILED DESCRIPTION OF THE PREFERRED EMBODIMENT

Preferred embodiments of the apparatus according to the present invention will hereunder be explained in more detail referring to the attached drawings.

EXAMPLE 1

Figure 1:
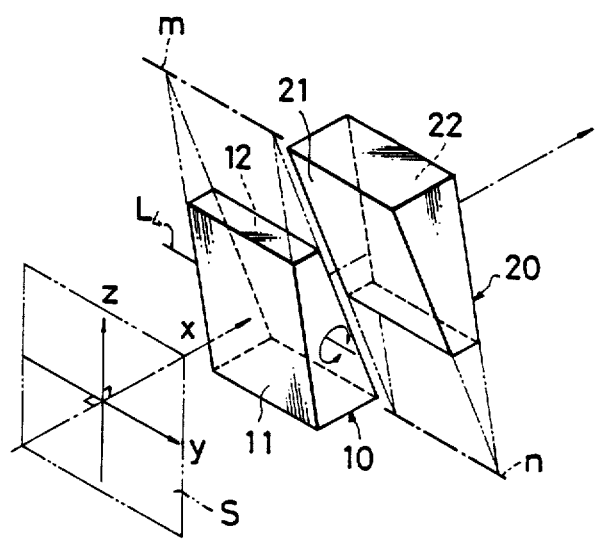
FIG. 1 is a diagram illustrating the arrangement and the construction of prisms in the first embodiment of the apparatus for adjusting light beam direction according to the present invention.
Figure 2:
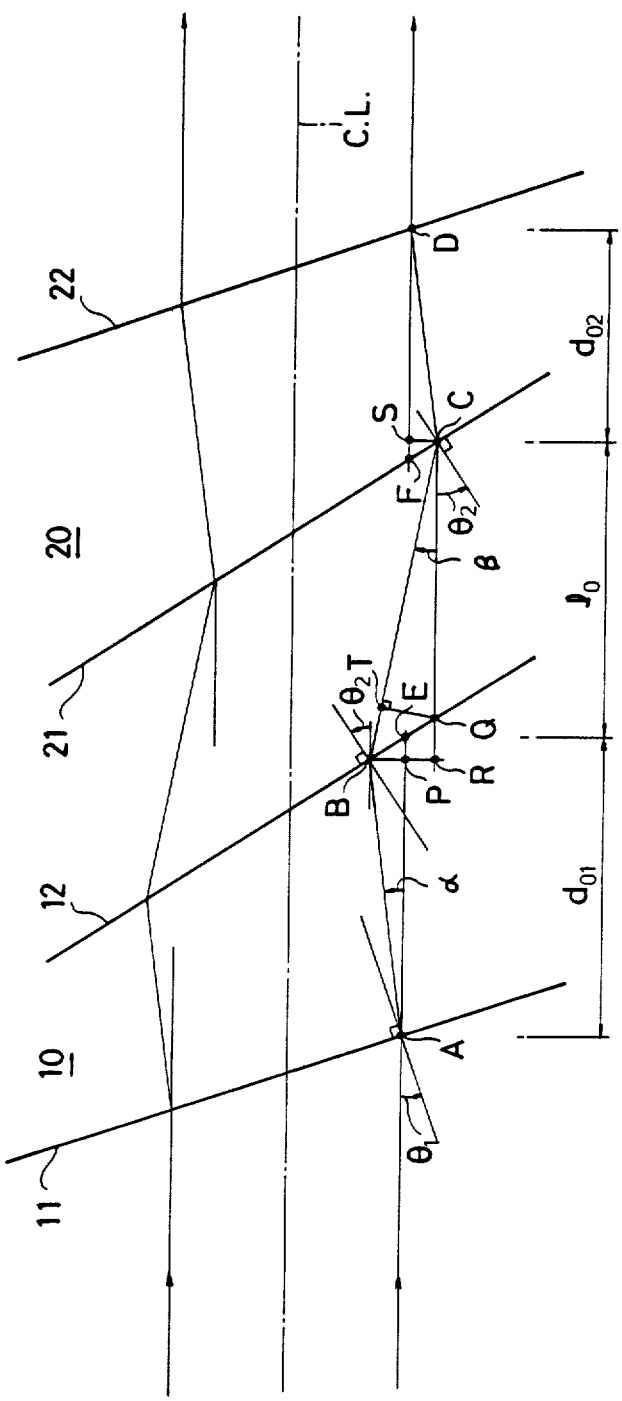
FIG. 2 is a diagram showing light path which is refracted by the apparatus for adjusting light beam direction shown in FIG. 1.

The first embodiment of the apparatus according to the present invention is shown in FIGS. 1 and 2.

This apparatus for adjusting light beam direction is designed to one dimensionally adjust the light beam direction and is provided with the first and the second prisms 10 and 20 which are, in order, arranged along the incident direction x of light beam shown by a alternate long and short dash line in FIG. 1. The prism 10 is a hexahedron having an incident face 11 and an outgoing face 12 which are non-parallel to one another while the second prism 20 has the same shape as that of the first prism 10. In this respect, it is assumed that there is a vertical plane S perpendicular to the progressing direction x of the light beam and there is a rectangular coordinate y-z on the vertical plane S.

The prisms 10 and 20 are arranged so that each of the incident faces 11 and 21 and the outgoing faces 12 and 22 is parallel to the axis y. Therefore, the intersectional line m of the extended incident face 11 and the extended outgoing face 12 of the first prism 10 becomes parallel to the intersectional line n of the extended incident face 21 and the extended outgoing face 22, and these intersectional lines m and n also become parallel with the axis y.

In addition, the first prism 10 is designed to be able to adjustably rotate around a rotational axis L4 parallel to the axis y, in this embodiment.

The incident face 11 and outgoing face 12 of the first prism 10 are defined by rotating the vertical plane S. Because the incident face 11 is parallel with a plane which is assumed by rotating the vertical plane counterclockwise, in the figure, around the intersectional line m by an angle $\theta_1$ (the first acute angle; see FIG. 2). While the outgoing face 12 thereof is parallel to a plane which is assumed by rotating the vertical plane counterclockwise, in the figure, around the intersectional line m by angle $\theta_2$ (the second acute angle; $\theta_1 < \theta_2$).

On the other hand, in the zero-adjusting state in which the angle between the incident light beam and the outgoing light beam (combined deviation angle becomes zero, the second prism 20 is arranged so that the incident face 21 of the second prism 20 is parallel to the outgoing face 12 of the first prism 10 while the outgoing face 22 thereof is parallel to the incident face 11 of the first prism 10.

FIG. 2 shows the behavior of light path refracted by these prisms at the zero-adjusting state and is a sectional view taken along the plane x-z. In this connection, the incident and outgoing faces of each prism would always be parallel to, the axis y irrespective of the magnitude of the composed deviation angle, within the sectional plane (not shown) taken along the plane x-y.

According to this apparatus for adjusting light beam direction, the light beam direction can finely be adjusted by adjustably rotating the first prism 10, in accordance with the relation between the incident angle and the deviation angle. Furthermore, this apparatus is designed so that the incident faces of the both prisms are inclined towards the same direction with respect to the incident direction of light beam so as to be $\theta_1 < \theta_2$ and, therefore, the light beam is deflected towards upper direction, in figure, within each prism as shown in FIG. 2 and at the region between these two prisms, it is deflected towards lower direction in the figure.

Thus, the shift between the incident light beam and the outgoing light beam can be restricted to a level lower than that observed in a conventional apparatus and it is also possible to reduce the shift even to zero at the zero adjusting state, if these prisms are arranged so as to satisfy desired requirements.

Moreover, when two prisms having identical shapes are employed in a symmetrical relationship, the chromatic aberration and the change in the shape of the light beam due to one prism would be compensated by the other prism and thus the light beam transmitting therethrough is not almost influenced by these factors.

The requirements for reducing, to zero, the shift between the incident light beam and the outgoing light beam at the zero-adjusting state will now be explained below in detail with reference to the attached FIG. 2.

The alternate long and short dash lines in FIG. 2 is the center line C.L. of the incident light beam and is depicted along the incident direction of the light beam while disregarding the refraction by the prisms.

In this case, if it is intended to indicate an angle between a plane or rays of light and the center line C.L., the angle in the counterclockwise direction is defined to be positive.

As shown in FIG. 2, the normals of the incident face 11 of the first prism 10 and the outgoing face 22 of the second prism 20 are inclined at an angle $\theta_1$ to the center line C.L. while those of the outgoing face 12 of the first prism 10 and the incident face of the second prism 20 are inclined at angle $\theta_2$ with respect to the center line C. L.

The apparatus of the invention will hereunder be explained referring to the ray of light which is the lower marginal of the light beam by way of an example. The intersections between this ray of light and each plane of the prisms as well as other standard points are defined as follows:

A: the intersection of the ray of light and the incident face 11 of the first prism 10;
B: the intersection of the ray of light and the outgoing face 12 of the first prism 10;
C: the intersection of the ray of light and the incident face 21 of the second prism 20;
D: the intersection of the ray of light and the outgoing face 22 of the second prism 20 ;
E: the intersection of a straight line which passes through points A and D and is parallel to the center line C.L. and the outgoing face 12 of the first prism 10;
F: the intersection of the aforementioned straight line and the incident face 21 of the second prism 20;
P: the intersection of a perpendicular drawn from the point B to the line segment AE and the line segment AE;
Q: the intersection of a straight line which passes through the point C and is parallel to the center line C.L. and the outgoing face 12 of the first prism 10;
R: the intersection of the lengthened line segment BP and the lengthened segment CQ;
S: the intersection of a perpendicular drawn from the point C to the line segment DF and the line segment AE;
T: the intersection of a perpendicular drawn from the point Q to the line segment BC and the line segment BC.

Moreover, it is defined as $<BAE=\alpha$, $<BCQ=-\beta$, $AE=d_{01}$, and $FD=d_{02}$, and that a distance between the outgoing face 12 of the first prism 10 and the incident face 21 of the second prism 20, which is along the straight line parallel to the center line C.L. is $l_0$. In this respect, the sum of $d_{01}$ and $d_{02}$ ($d_{01}+d_{02}$) is a constant value $d_0$ even if the line moves parallel in the upper or lower direction in the figure.

In the optical system thus arranged, in order to lie the point A, E, F and D on a straight line and to thus reduce the shift of the ray of light concerned to zero, it is sufficient to arrange these two prisms so that the shift of the ray of light within each prism, towards upper direction in the figure, can be compensated by the shift thereof between the two prisms, towards lower direction in the figure. Therefore, it should be required to obtain conditions which satisfy the following relation:

$$BP+CS=BR \tag{1}$$

In the following calculation, it is assumed that $BP=\Delta_1$, $CS=\Delta_2$ and $BR=\Delta_3$.

If the refractive index of the prism is equal to n, the following relation is obtained:

$$\alpha = \theta_1 - \sin^{-1}(\sin\theta_1/n)$$

In addition, if length of the line segment PE is a, the following two equations are obtained:

$$\Delta_1 = (d_{01}-a)\tan\alpha, \text{ and}$$
$$a = \Delta_1 \cdot \tan\theta_2$$

Then, the following relation is obtained by eliminating a from these equations and rearranging the resultant equation:

$$\Delta_1 = \frac{d_{01} \cdot \tan\alpha}{1 + \tan\theta_2 \cdot \tan\alpha}$$

According in the same manner, $\Delta_2$ is given by the following equation:

$$\Delta_2 = \frac{d_{02} \cdot \tan\alpha}{1 + \tan\theta_2 \cdot \tan\alpha}$$

Since $d_{01}+d_{02}=d_0$, the sum of $\Delta_1$ and $\Delta_2$ is given by the following equation:

$$\Delta_1 + \Delta_2 = \frac{d_0 \cdot \tan\alpha}{1 + \tan\theta_2 \cdot \tan\alpha} \tag{2}$$

On the other hand, $\Delta_3$ can be determined as follows: First of all, $\beta$ is given by the equation:

$$\beta = \theta_2 - \sin^{-1}(n \cdot \sin(\theta_2-\alpha))$$

Therefore, the following three relations hold true:

$$\Delta_3 = BQ \cdot \cos\theta_2;$$

-continued $$BQ = \frac{QT}{\sin(\pi/2 - (\theta_2 - \beta))}; \text{ and}$$

$$QT = -l_0 \cdot \sin\beta$$

Then, if eliminating BQ and QT from these equations and rearranging $\Delta_3$ is given by the following equation:

$$\Delta_3 = \frac{-l_0 \cdot \sin\beta \cdot \cos\theta_2}{\cos(\theta_2 - \beta)} \tag{3}$$

$$= \frac{-l_0 \cdot \sin\beta \cdot \cos\theta_2}{\cos\beta \cdot \cos\theta_2 + \sin\beta \cdot \sin\theta_2}$$

$$= -\frac{-l_0}{(1/\tan\beta) + \tan\theta_2}$$

If substituting the equations (2) and (3) for the equation (1) and solving the resultant equation for $l_0$, the following relation is obtained:

$$l_0 = \frac{-d_0 \cdot \tan\alpha}{\tan\alpha \cdot \tan\theta_2 + 1} \left( \frac{1}{\tan\beta} + \tan\theta_2 \right) \tag{4}$$

Thus, if $l_0$ established so as to satisfy the equation (4), it is possible to make the shift of the both incident and outgoing light beams zero at the zero-adjusting state.

Figure 3:
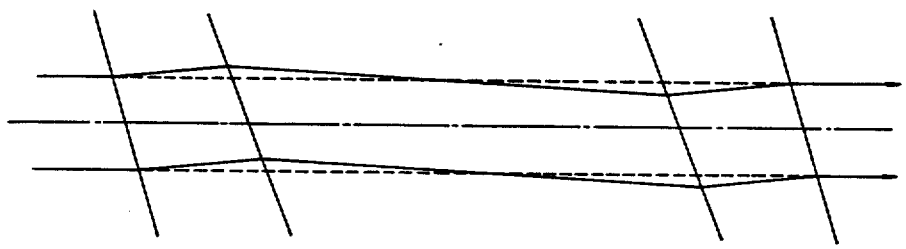
FIG. 3 and 4 are diagrams showing light path refracted by variations of prism-arrangement, similar to that shown in FIG. 2.
Figure 4:
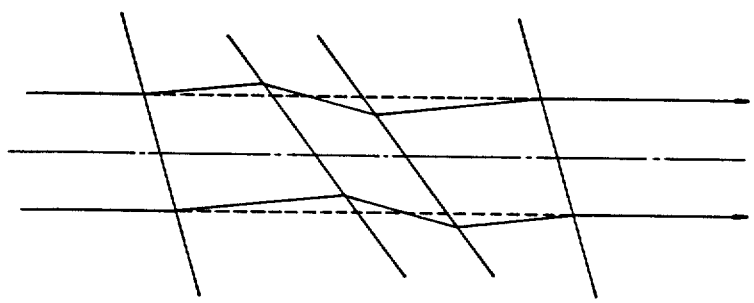

FIGS. 3 and 4 are diagrams showing light path in accordance with arrangements which satisfy the relation (4) and differ from that shown in FIG. 2.

As seen from the light paths shown in FIGS. 3 and 4, the distance between the prisms can be established freely in order to coordinate a relation between the first acute angle $\theta_1$ and the second acute angle $\theta_2$, if the refractive index is fixed to a constant value. However, if the difference between the first acute angle and the second acute angle is extremely large, the changing rate of the deviation angle with respect to the variation of the incident angle becomes large and, therefore, the fine adjustment involves great difficulties, on the other hand, if the difference is quite small, the distance between the prisms becomes very long and thus a wide space is required. Under such circumstances, it is desirable to establish the angles within the range defined by the following relation:

$$0.5 < \frac{n(\theta_1 - \theta_2)}{\theta_1} < 1.5$$

in order to satisfy the aforementioned requirements.

Figure 14:
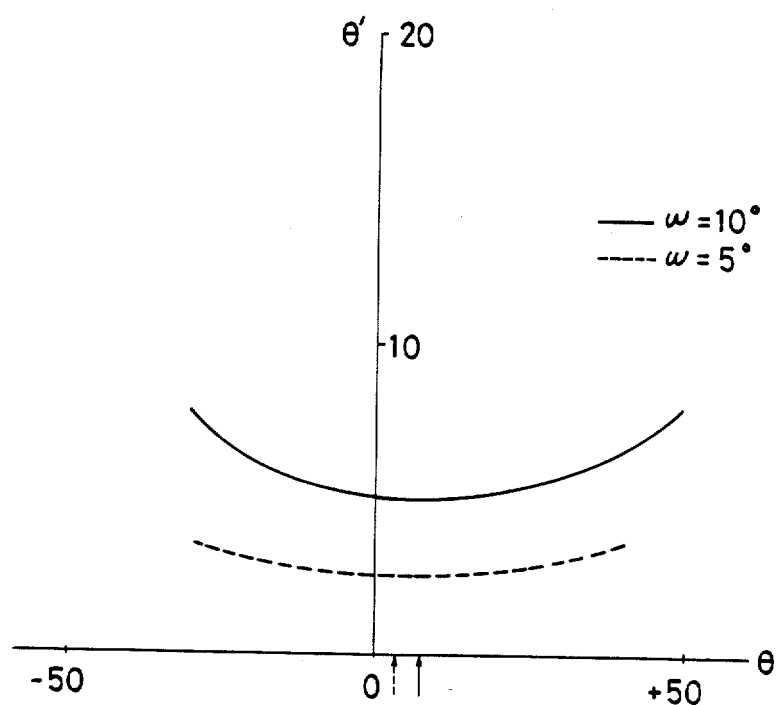
FIG. 14 is a graph showing the relation between the incident angle and the deviation angle of a prism.
Figure 15:
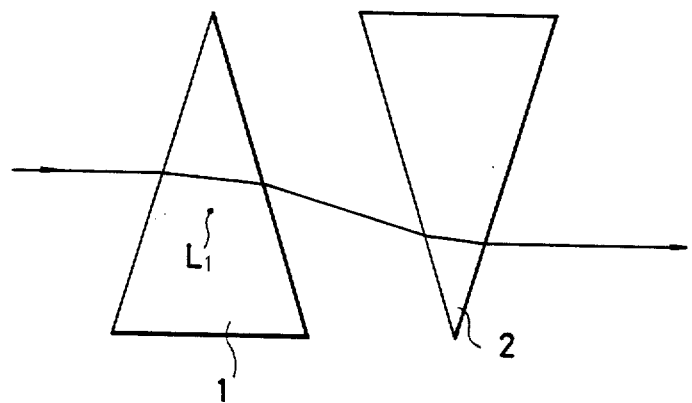
FIG. 15 is a diagram of light path which is refracted by a conventional apparatus for one dimensionally effecting adjustment of light beam direction.
Figure 16:
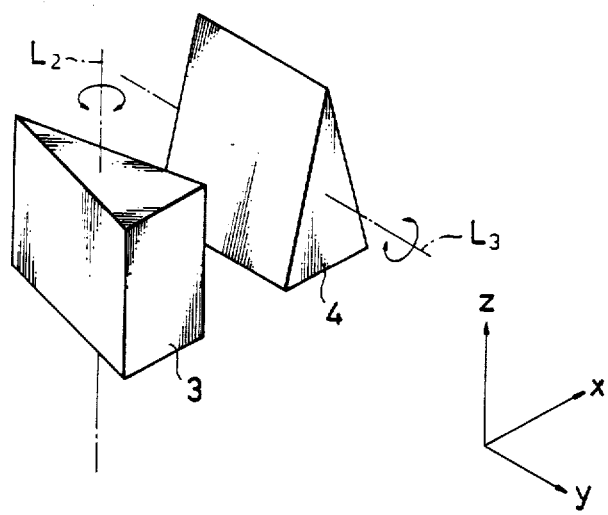
FIG. 16 is diagram showing the arrangement and the construction of prisms in a conventional apparatus for two dimensionally effecting adjustment of light beam direction.
Figure 17:
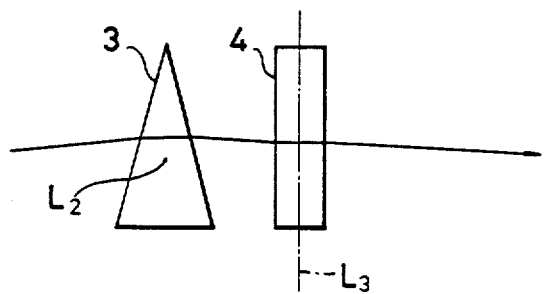
FIGS. 17 and 18 are diagrams of light path refracted by the conventional apparatus shown in FIG. 16.
Figure 18:
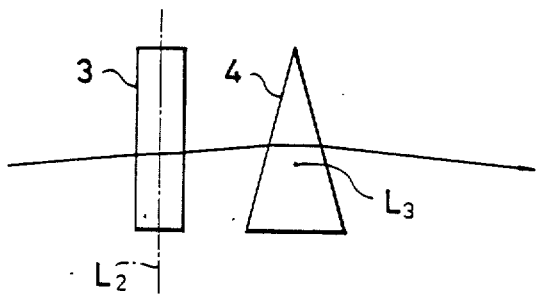

In this respect, the region in which the rate of change in the deviation angle corresponds to the region near the minimum angle of deviation indicated by an arrow in FIG. 14. However, if he angle is chosen so as to fall within the range defined by both sides of the minimum angle of deviation (including the same), the deviation only exhibits increment irrespective of the change in the incident angle, i.e., the tolerance of adjustment is restricted to only one side. For this reason, it is desirable to use the range more or less deviated from the vicinity of the minimum angle of deviation.

EXAMPLE 2

The second embodiment of the apparatus of the present invention will now be explained with reference to FIGS. 5 to 7.

As seen from these figures, the apparatus for adjusting light beam direction comprises a first group of prisms 100 consisting of a first prism 10 and a second prism 20 and a second group of prisms 200 composed of a third prism 30 and a fourth prism 40. In this embodiment, all the prisms used have the same shapes.

Figure 5:
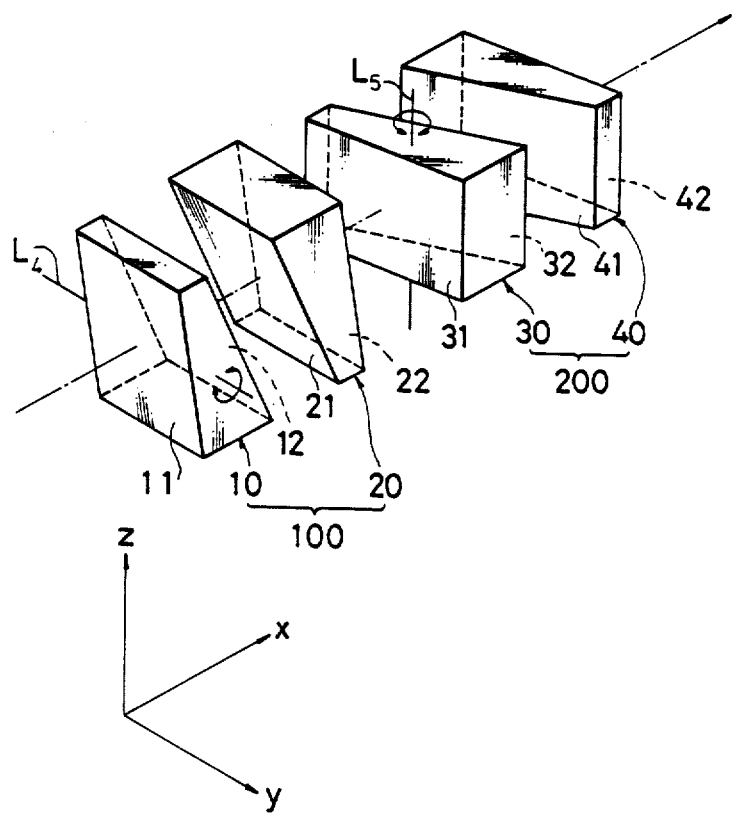
FIG. 5 is a diagram illustrating the arrangement and the construction of prisms in the second embodiment of the apparatus for adjusting light beam direction according to the present invention.
Figure 6:
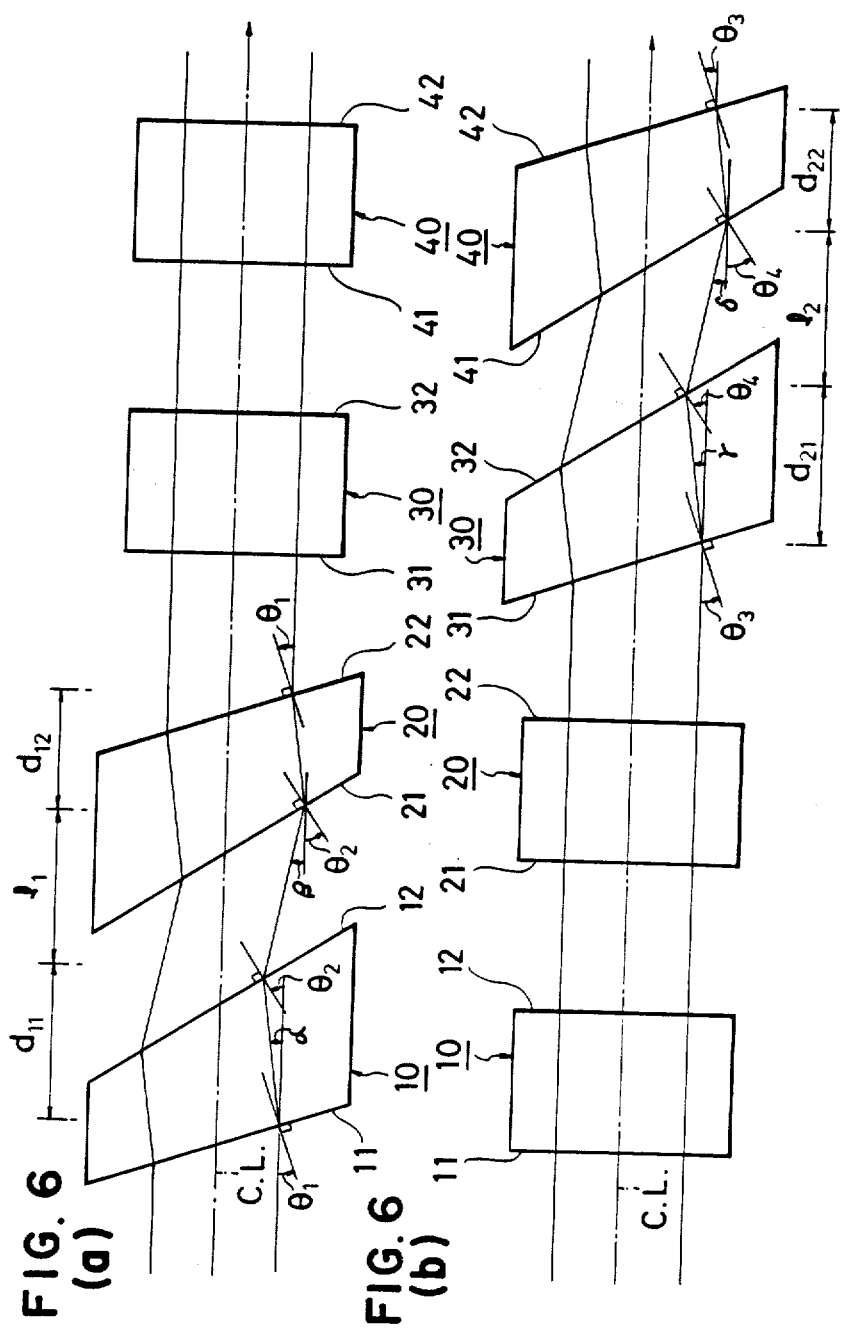
FIGS. 6 (a) and 6 (b) are diagrams illustrating light path which is refracted by the prisms shown in FIG. 5.

For simplifying the explanation, there are established an axis x parallel to the incident direction of light beam designated by an alternate long and short dash line in FIGS. 5 and 6, and axes y and z perpendicular to the axis x.

The first group of prisms 100 comprises the first prism 10 and the second prism 20 which are arranged in the same manner as in the first embodiment shown in FIG. 1. That is, the first and second prisms 10 and 20 are arranged so that the incident faces 11, 21 and the outgoing faces 12, 22 of these prisms are parallel to the axis y and the first prism 10 is disposed so as to be able to rotate around a first rotational axis $L_4$ parallel to the axis y.

On the other hand, the second prism 20 is disposed, at the zero-adjusting state, so that the incident face 21 thereof is parallel to the outgoing face 12 of the first prism 10 while the outgoing face 22 thereof is parallel to the incident face 11 of the prism 10.

The third and fourth prisms 30 and 40 of the second group of prisms 200 are likewise arranged in the same relative positions as those in the first group of prisms 100. The incident faces 31, 41 and the outgoing faces 32, 42 of the third and fourth prisms 30 and 40 are arranged so as to be parallel to the axis z and the third prism 30 is designed to be able to adjustably rotate around a second rotational axis $L_5$ parallel to the axis z.

On the contrary, the fourth prism 40 is disposed, at the zero-adjusting state, so that the incident face 41 thereof is parallel to the outgoing face 32 of the third prism 30 while the outgoing face 42 thereof is parallel to the incident face 31 of the third prism 30.

In this apparatus, the direction of the outgoing light beam can be adjusted two dimensionally by adjustably rotating the first and third prisms 10 and 30 in accordance with the aforementioned relation between the incident angle and the deviation angle.

In such an arrangement, the first group of prisms 100 is only involved in the adjustment of the light beam direction within the x-z plane if the second group of prisms 200 is in the zero-adjusting state. While the second group of prisms 200 is involved only in the adjustment of the light beam direction within the x-y plane when the first group of prisms 100 is in the zero-adjusting state. Therefore, in these cases, one of the group of prisms does not interfere the adjustment of directions in the other group of prisms and thus the adjustment in each direction can independently be effected.

Next, the relative arrangement of these prisms will hereunder be explained in more detail referring to FIG. 6 which is a cross-sectional view of the apparatus at the zero-adjusting state shown in FIG. 5, wherein FIG. 6 (a) is a sectional views thereof taken along a plane parallel to x-z plane and FIG. 6 (b) is a sectional view thereof taken along a plane parallel to x-y plane. In this connection, the same definitions of angle and points as in Example 1 also hold herein.

As shown in FIG. 6 (a), in x-z plane, the normals of the incident face 11 of the first prism 10 and the outgoing face 22 of the second prism 20 form an angle 8 (the first acute angle) with respect to center line C.L. while the normals of the outgoing face 12 of the first prism 10 and the incident face 21 of the second prism 20 form an angle $\Delta_2$ (the second acute angle; $\theta_1 < \theta_2$) with respect to the center line C.L.

On the other hand, it would be recognized that the incident faces 31, 41 and the outgoing faces 32, 42 of the third and fourth prisms 30 and 40 are, in FIG. 6(a), projected perpendicularly to the center line C.L. and are not involved in the refraction in this direction shown in FIG. 6 (a).

Referring now to FIG. 6 (b), it is found that, in x-y plane, the normals of the incident face 31 of the third prism 30 and the outgoing face 42 of the fourth prism 40 form, an angle $\theta_3$ (the third acute angle) with respect to the center line C.L. while the normals of the outgoing face 32 of the third prism 30 and the incident face 41 of the fourth prism 40 form an angle $\theta_4$(the fourth acute angle; $\theta_3 < \theta_4$) with respect to the center line C.L.

On the other hand, the incident and outgoing faces 11, 12, 21 and 22 of the first and second prisms 10 and 20 are projected on the plane shown in FIG. 6 (b), perpendicularly to the center line C.L. and are not involved in the refraction in this direction shown in FIG. 6 (b) as in the aforementioned case.

This apparatus for adjusting light beam direction according to the second embodiment of this invention is designed so that the incident and outgoing faces of the first group of prisms 100 are inclined towards the same direction with respect to the incident direction of light beam and that the requirement, $\theta_1 < \theta_2$, is satisfied as well as designed, so that the incident and outgoing faces of the second group of prisms 200 are likewise inclined towards the same direction with respect to the direction of incident light beam and that the requirement, $\theta_3 < \theta_4$, is satisfied. This makes it possible to suppress the magnitude of the shift between the incident light beam and the outgoing light beam to a value smaller than that observed in conventional apparatuses.

Moreover, if the prisms are arranged so that the following requirements are satisfied, it becomes possible to reduce the shift between the incident and outgoing light beams, at the zero-adjusting state, to zero as in the first embodiment:

$$l_1 = \frac{-d_1 \cdot \tan \alpha}{\tan \alpha \cdot \tan \theta_2 + 1} \left( \frac{1}{\tan \beta} + \tan \theta_2 \right)$$

$$\alpha = \theta_1 - \sin^{-1}\left(\frac{\sin \theta_1}{n}\right)$$

$$\beta = \theta_2 - \sin^{-1}(n \cdot \sin(\theta_2 - \alpha))$$

$$l_2 = \frac{-d_2 \cdot \tan \gamma}{\tan \gamma \cdot \tan \theta_4 + 1} \left( \frac{1}{\tan \delta} + \tan \theta_4 \right)$$

$$\gamma = \theta_3 - \sin^{-1}\left(\frac{\sin \theta_3}{n}\right)$$

$$\delta = \theta_4 - \sin^{-1}(n \cdot \sin(\theta_4 - \gamma))$$

wherein $l_1$ represents the distance between the outgoing face 12 of the first prism 10 and the incident face 21 of the second prism 20 along the direction of incident light beam; $l_2$ the distance between the outgoing face 32 of the third prism 30 and the incident face 41 of the fourth prism 40 along the direction of incident light beam ; $d_1$ the sum $(d_{11} + d_{12})$ of the thickness of the first prism $d_{11}$ and the second prism $d_{12}$ on a straight line parallel to the center line C.L.; $d_2$ the sum $(d_{21} + d_{22})$ of the thickness of the third prism $d_{21}$ and the fourth prism $d_{22}$ on a straight line parallel to the center line C.L.; n the refractive index of the prisms and $\alpha$, $\beta$, $\gamma$, and $\delta$ are angles in which the angle in the counterclockwise direction is defined to be positive.

A variety of conditions can satisfy the foregoing equations, however, in taking the capacity for fine adjustment and the space occupied by the apparatus into consideration, it is desirable that the angles be chosen so as to fall within the range defined by the following relation as in the first embodiment:

$$0.5 < \frac{n(\theta_1 - \theta_2)}{\theta_1} < 1.5; \text{ and}$$

$$0.5 < \frac{n(\theta_3 - \theta_4)}{\theta_3} < 1.5$$

On the second embodiment of the invention, four prisms in all (a pair of prisms adjusts the light beam direction which is perpendicular to that adjusted by the other pair of prisms) are employed, however, each pair of prisms is not necessarily arranged so as to be adjacent to one another as in the above embodiment.

For instance, a first group of prisms having the incident and outgoing faces parallel to the axis y, in FIG. 7 and a second group of prisms having the incident and outgoing faces parallel to the axis z may be specially combined with each other so as to arrange, in order, the first prism 10, the third prism 30, the second prism 20 and the fourth prism 40 along the incident direction of the light beam.

According to such an arrangement, it becomes possible to make effective use of the space which is enlarged when relatively small values are chosen for the first to fourth acute angles $\theta_1$ to $\theta_4$ so as to be favorable for fine adjustment. For this reason, it is possible to simultaneously satisfy the two requirements, i.e., fine adjustment and space saving which are reciprocal in the first embodiment and the apparatus having such an arrangement is quite convenient practically.

EXAMPLE 3

Figure 8:
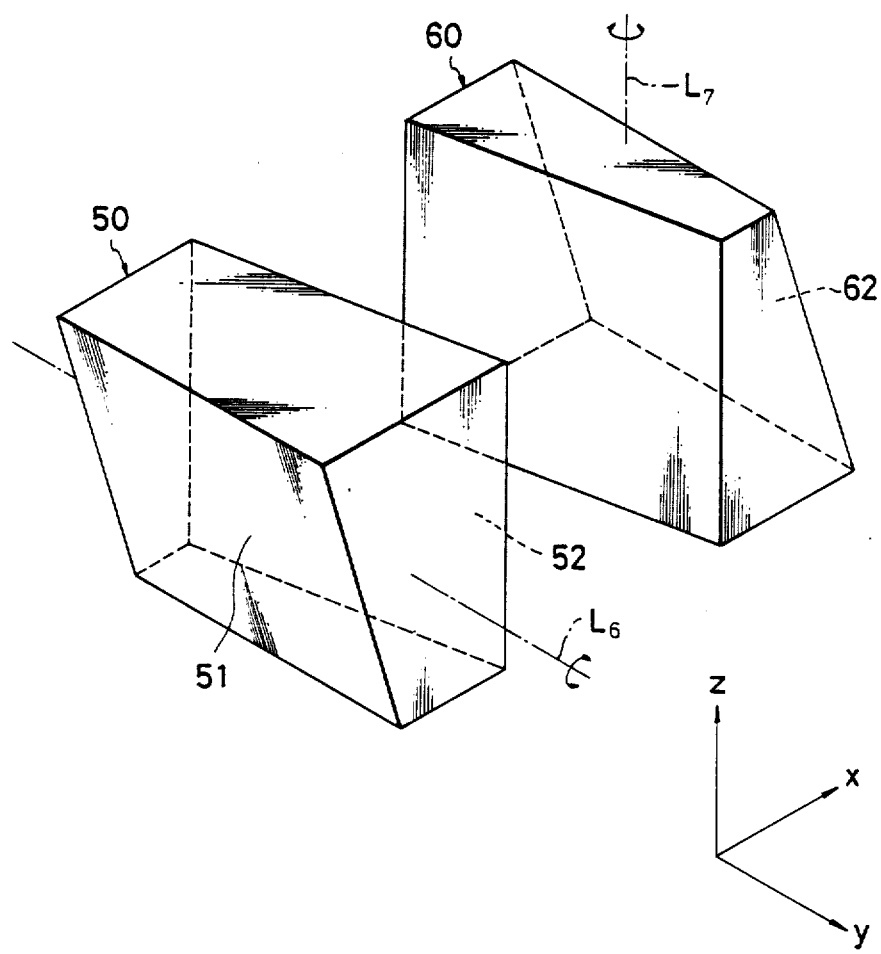
FIG. 8 is a diagram showing the arrangement and the construction of prisms in the third embodiment of the apparatus for adjusting light beam direction according to the present invention.
Figure 10:
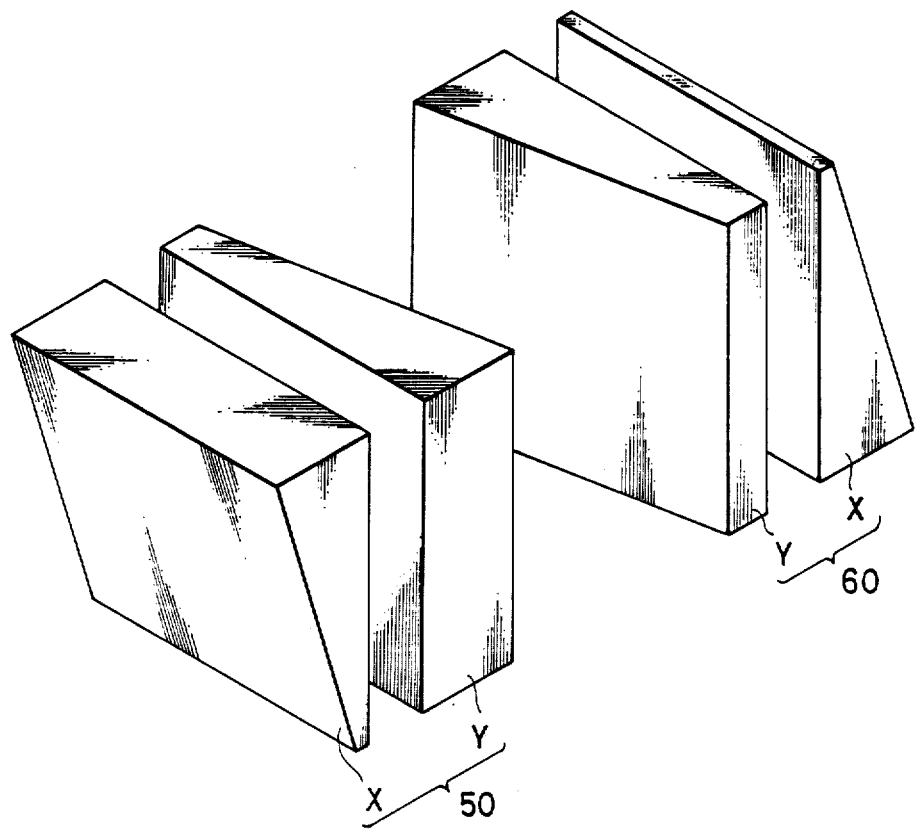
FIG. 10 is a decomposed perspective view illustrating an example of method for manufacturing the prism shown in FIG. 8.

FIGS. 8 to 10 are diagrams showing the third embodiment of the present invention. The apparatus according to the second embodiment is one capable of two dimensional adjustment of the light beam direction utilizing 4 prisms, on the contrary, the apparatus according to this third embodiment is one which permits two dimensional adjustment while using only two prisms.

As shown in FIG. 8, the apparatus for adjusting light beam direction according to this embodiment comprises a first and a second prisms 50 and 60 which are arranged, in order, along the direction of progress x of light beam. These prisms 50 and 60 are hexahedrons each having an incident face 51 or 61 and an outgoing face 52 or 62 which are non-parallel to one another.

For the sake of explanation, a rectangular coordinate comprising axes x, y and z is established. The axis x is corresponding to the direction of progress of the light beam, the axis y is perpendicular to the axis x, and the axis z is perpendicular to both x and y axes. Now, the arrangement of the prisms 50 and 60 will be explained in detail on the basis of the coordinate.

First of all, the first prism 50 is designed so that the light beam direction can be adjusted by rotating the prism around a first rotational axis $L_6$ parallel to the axis y, while the second prism 60 is likewise designed so as to be able to adjustably rotate the same around a second rotational axis $L_7$ parallel to the axis z. Moreover, at the zero-adjusting state, the incident face 51 of the first prism 50 and the outgoing face 62 of the second prism 60 are parallel to a plane which is assumed to rotate y-z plane around the axis y, while the outgoing face 52 of the first prism 50 and the incident face 61 of the second prism 60 are likewise parallel to a plane which is assumed to rotate y-z plane around the axis z.

Since the apparatus according to this embodiment has such an arrangement explained above, the virtual intersectional line of the extended incident face 51 of the first prism 50 and the extended outgoing face 52 thereof becomes non-parallel to both the first and the second rotational axes $L_6$ and $L_7$ and the virtual intersectional line of the extended incident and outgoing, faces 61, 62 of the second prism 60 also becomes non-parallel to the same rotational axes $L_6$, $L_7$.

FIG. 9 is a diagram showing the refractive behavior of rays of light at the zero-adjusting state, in which FIG. 9 (a) is a sectional view taken along a plane parallel to the x-y plane passing through the center of the prisms while FIG. 9 (b) is a sectional view taken along a plane parallel to the x-z plane passing through the center of the prisms. As seen from these figures, the incident rays of light and the outgoing rays of light become parallel to one another at the zero-adjusting state and cause a small shift towards the direction of y axis and z axis.

In the apparatus for two dimensionally adjusting light beam direction, explained above, the first prism 50 is adjusted by rotating the same around the first rotational axis $L_6$ if it is intended to vary the outgoing angle of the light beam progressing along x axis, making along a plane parallel to x-z plane. And the second prism 60 is adjusted by rotating the same around the second rotational axis $L_7$ when it is intended to vary the outgoing angle of the light beam making along a plane parallel to x-y plane.

These prisms are arranged so that the light beam is passed therethrough within a range in which the rate of change in the deviation angle is small due to change in the incident angle. Therefore, as compared to the angle due to the adjustment by the rotation of the prisms, the deviation angle (in other word, change in the outgoing angle of the light beam) is extremely small and thus the fine adjustment of the light beam can be effected easily and precisely.

It should be noted that the region in which the rate of change in the deviation angle is minimum corresponds to the region near the minimum angle of deviation indicated by an arrow in FIG. 14, however, if the angle is chosen so as to fall within the range defined by both sides of the minimum angle of deviation (inclusive of the same), the deviation simply exhibit increment irrespective of the change in the incident angle, i.e., the tolerance of adjustment is simply onesided. For this reason, it is desirable to chose the range deviated, more or less, from the vicinity of the minimum angle of deviation.

In addition, when using two prisms having such symmetrical shapes, the chromatic aberration and the change in shape of the light beam due to one of the prism is effectively compensated by the action of the other prism and, therefore, these factors exert almost no influence on the transmitting light beam. The apparatus according to the third embodiment makes it possible to make the incident and outgoing directions of the light beam parallel to each other, however, this apparatus cannot reduce the shift to zero as in the apparatus according to the second embodiment. However, the apparatus permits the reduction of space to be occupied by itself, when compared with the second embodiment, since this comprises only two prisms.

The prisms 50 and 60 have shapes different from each other and further have complicated shapes and, therefore, they must be processed one by one. This means that the processing thereof is effected with a slight difficulty or is relatively troublesome.

However, such a problem associated with the processing thereof can be solved by adopting a method for manufacturing them, in which each prism is prepared by joining two members X and Y together as shown in FIG. 10.

Each prism 50 and 60 having a symmetrical shape may be divided into two members X and Y when it is cut along a plane perpendicular to the incident direction of rays of light. Therefore, these members may be joined together while changing the orientation thereof to form each prism 50 or 60. In this respect, these two members have rather simple shapes such as those obtained by cutting off a part of a triangonal prism in the vicinity of the apex part thereof and may easily be produced by processing a pillar-like glass material to form a triangonal long prism and then cutting the same in a desired length to obtain individual several members. In other words, the prisms 50, 60 comprise forming first blocks by cutting a first polygonal pillar-like base material along a direction perpendicular to the longitudinal direction of the first base material, on the other hand forming second blocks by cutting a second polygonal pillar-like base material along a direction perpendicular to the longitudinal direction of the second base material and then joining the first and second blocks together while properly changing orientation thereof. Thus, the workability in processing the prisms 50 and 60 can be substantially enhanced by producing them from such members X and Y.

EXAMPLE 4

Figure 11:
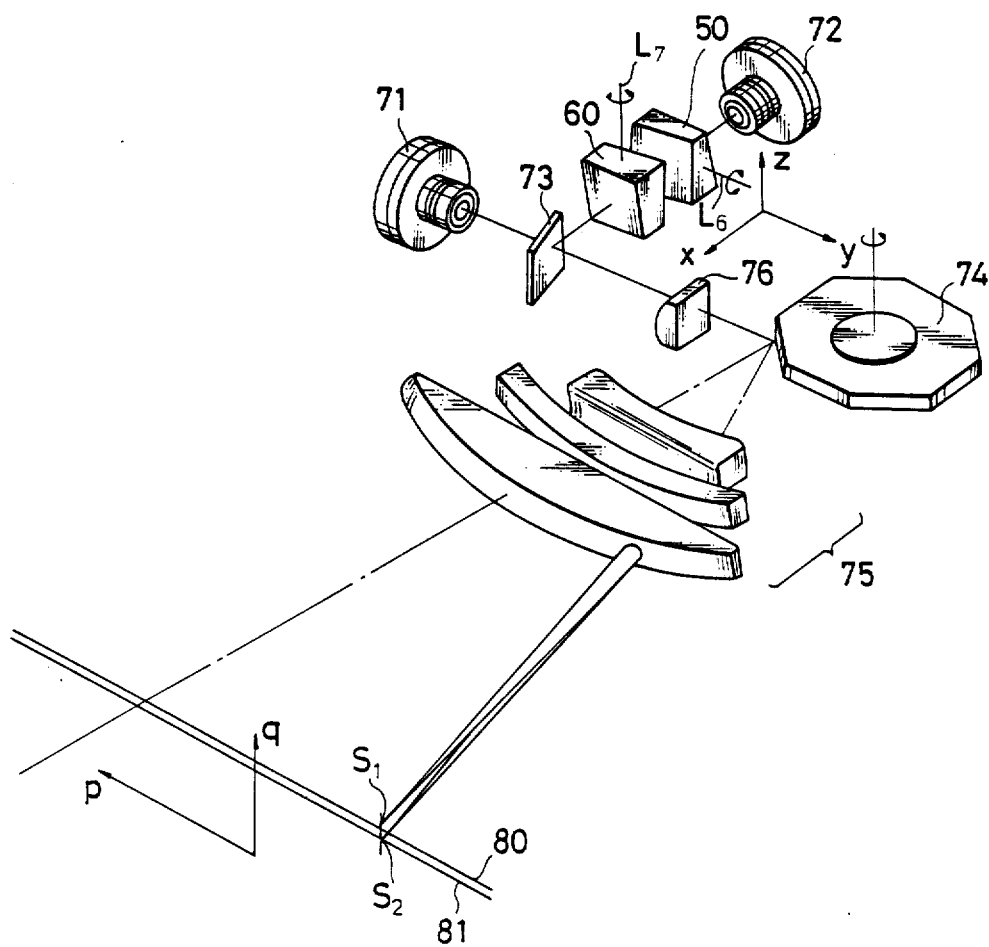
FIG. 11 is a diagram for illustrating a scanning optical apparatus in which the apparatus for adjusting light beam direction of the present invention is incorporated therein.

This example is given to explain an application of the apparatus for adjusting light beam direction. FIG. 11 shows such an example in which the third embodiment of the present invention is incorporated into a scanning optical apparatus.

As shown in FIG. 11, the twin beam scanning optical device comprises a light source 71 emitting the reference beam; a light source 72 emitting a beam of which angle can be changed; a half mirror 73 for combining these beams; a polygonal mirror 74 acting as a deflecting system for deflecting the combined beam; and an $f\theta$ lens 75 serving as a scanning lens which can concentrate the beam reflected by the polygonal mirror 74 and can form spots $S_1$ and $S_2$ on a subject to be scanned. In this connection, the spots $S_1$ and $S_2$ are arranged parallel on the subject to be scanned along feed direction (sub-scanning direction) q.

Each beam is rectified in a desired shape by the action of a cylindrical lens 76 and is made incident at a variety of angles with respect to the $f\theta$ lens 75 due to the rotational motion of the polygonal mirror 74. Thus, the spots $S_1$ and $S_2$ formed on the subject to be scanned due to the foregoing operations are scanned towards the scanning direction (principal scanning direction) p and form two rows of dots 80 and 81 on the subject to be scanned in proportion to the power of light sources 71 and 72.

On the other hand, the subject to be scanned is transferred in the feed direction q by a driving means (not shown) and thus a two dimensional image is formed on the subject to be scanned, as a set of dots, in cooperation with the foregoing scanning of the spots $S_1$ and $S_2$.

An apparatus for adjusting light beam direction 10 which can adjust the angle of the beam, capable of changing angle thereof, with respect to the reference beam is disposed between the light source 72 and the half-mirror 73. The apparatus for adjusting light beam direction comprises two prisms 50 and 60 such as these shown in FIG. 8 in an enlarged state and a means for changing angle which can adjust the angle of these prisms and will hereunder be explained in detail.

If the relative positions of the spots $S_1$ and $S_2$ are not proper, an irregular image is formed. In such case, it is needed to properly correct the relative positions of the spots. The conventional scanning optical apparatus has not the apparatus for adjusting light beam direction explained above. And the adjustment of the angle between the beams was effected by controlling and rotating the half-mirror 73.

However, it is very difficult to carry out the adjustment of such relative positions of the spots $S_1$ and $S_2$ by rotating and controlling the half-mirror 73 since a highly precise such adjustment of the half-mirror is required.

More specifically, the diameter of the spot is in the range of from about 50 to 60$\mu$, and the distance between the centers of these two spots is about 50$\mu$ and, therefore, the adjustment of the spot $S_2$ in the direction of sub-scanning q with respect to the spot $S_1$ *requires accuracy in the order of a micron. For instance, in order to move the spot $S_2$ by* 5$\mu$, the half mirror 73 must be rotated only by 2"(2/3600 deg.). It is thus practically impossible to accurately effect such a fine adjustment.

Thus, this scanning optical apparatus is designed so that, utilizing the apparatus for adjusting light beam direction of the type explained above, the angle of the beam of which angle can be changed with respect to the reference beam is changed by rotating and adjusting the prisms 50 and 60 to cause a displacement of the spot $S_2$ relative to the spot $S_1$.

In other words, when the spot $S_2$ is moved relative to the spot $S_1$ mainly in the feed direction q, the prism 50 is rotated and adjusted around the axis $L_6$ while if the spot $S_2$ is moved mainly in the scanning direction p, the prism 60 is rotated and adjusted around the axis $L_7$.

These prisms 50 and 60 are arranged so as to make incident the beam, of which angle can be changed, within a region in which the rate of change in the deviation angle due to the change in the incident angle is small as already mentioned above and, therefore, the prism can be rotated and adjusted in minute unit or in degree unit if it is intended to move the spot $S_2$ in micron unit, that is it is intended to change the angle of the beam emitting from the light source 72 in the order of a second. Thus, according to such scanning optical apparatus provided with the apparatus for adjusting light beam direction, the adjusting operations become extremely easy and the precise adjustment can be attained.

Upon adjustment, the beam of which angle can be changed causes not only an angle change but also a shift of the optical axis thereof more or less. Therefore, by displaceably disposing the light source 72 to compensate such a shift, more precise adjustment may be expected.

As the aforementioned means for changing angle of prism, there may be adopted a variety of methods such as those in which each prism is contained in a holder and the holder is rotatably set on the body of the apparatus.

Figure 12:
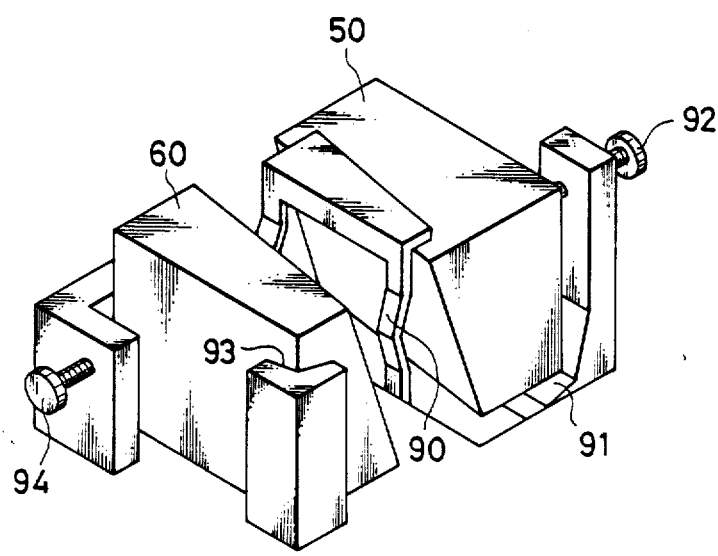
FIG. 12 is a perspective view showing an example of an adjusting mechanism for prisms.
Figure 13:
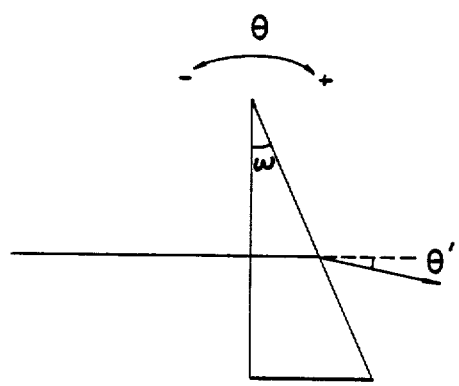
FIG. 13 is a diagram of light path for illustrating the relation between the incident angle and the deviation angle of a prism.

Referring now to FIG. 12 in which an example of the means for changing angle is depicted, the prism 50 is pressed against an wall 91 by the action of a leaf spring 90 and is positioned by the tip of a screw 92 for adjustment which opposes against the force exerted by the spring 90 and brings into contact with the prism. In addition, the prism 60 is pressed against a wall 93 by the action of a leaf spring (not shown) and is positioned by the tip of a screw 94 for adjustment which opposes against the force exerted by the spring and brings into contact with the prism 60. That is, the fine adjustment of the outgoing angle of the beam emitted from the light source 72 can be effected by screwing the screws 92 and 94 for adjustment.

It is a matter of course that in the scanning optical apparatus, the first and second embodiments may also be incorporated, although only the apparatus using the third embodiment is explained above.

In addition, the apparatus for adjusting light beam direction may be incorporated into not only the optical apparatus provided with two light sources but also these provided with a single light source.

Moreover, in the aforementioned embodiments, the apparatus is designed so that the spot $S_2$ is adjustable in both the scanning direction p and the feed direction q, however, the apparatus may also be designed so that the spot $S_2$ can be adjusted either of the foregoing two directions.

We claim:

1. An apparatus for adjusting light beam direction comprising a first prism and a second prism arranged, in order, along an incident direction of light beam, characterized in that an incident face of the first prism is defined by rotating a vertical plane which is perpendicular to the incident direction, around a rotational axis parallel to the vertical plane defined by rotating by a first acute angle;

an outgoing face of the first prism defined by rotating the vertical plane in the same direction as the first acute angle around the rotational axis by a second acute angle which is larger than the first acute angle;

an incident face of the second prism is parallel to the outgoing face of the first prism at zero-adjusting state;

an outgoing face of the second prism is parallel to the incident face of the first prism at the zero-adjusting state; and at least one of these two prisms is designed so as to adjustably rotate around the rotational axis.

2. An apparatus for adjusting light beam direction according to claim 1 wherein, at the zero-adjusting state, a distance $l_0$ between the outgoing face of the first prism and the incident face of the second prism along the incident direction of the light beam is given by the following equations:

$$l_0 = \frac{-d_0 \cdot \tan \alpha}{\tan \alpha \cdot \tan \theta_2 + 1} \left( \frac{1}{\tan \beta} + \tan \theta_2 \right)$$

$$\alpha = \theta_1 - \sin^{-1}\left( \frac{\sin \theta_1}{n} \right)$$

$$\beta = \theta_2 - \sin^{-1}(n \cdot \sin(\theta_2 - \alpha))$$

in the above equation, $d_0$ represents sum of thickness of the first and second prisms along a straight line parallel to the incident direction, $\theta_1$ is the first acute angle, $\theta_2$ is the second acute angle, n is refractive index of the prisms and $\alpha$ and $\beta$ are angles in which the angle in counterclockwise direction is defined to be positive.

3. An apparatus for adjusting light beam direction according to claim 1 wherein the first and second prisms have the same shapes.

4. An apparatus for adjusting light beam direction comprising a first prism, a second prism, a third prism and a fourth prism arranged along an incident direction of the light beam, characterized in that an incident face of the first prism is defined by rotating a vertical plane which is perpendicular to the incident direction, around a first rotational axis parallel to the vertical plane by a first acute angle;

an outgoing face of the first prism is defined by rotating the vertical plane in the same direction as that of the first acute angle around the first rotational axis by a second acute angle larger than the first acute angle;

an incident face of the second prism is parallel to the outgoing face of the first prism at zero-adjusting state;

an outgoing face of the second prism is parallel to the incident face of the first prism at the zero-adjusting state;

at least one of the first and second prisms is designed to adjustably rotate around a rotational axis parallel to the first rotational axis;

an incident face of the third prism is defined by rotating the vertical plane around a second rotational axis perpendicular to both the incident direction and the first rotational axis by a third acute angle;

an outgoing face of the third prism is defined by rotating the vertical plane in the same direction as that of the third acute angle around the second rotational axis by a fourth acute angle larger than the third acute angle;

an incident face of the fourth prism is parallel to the outgoing face of the third prism at the zero-adjusting state;

an outgoing face of the fourth prism is parallel to the incident face of the third prism at the zero-adjusting state; and at least one of the third and fourth prisms is designed to adjustably rotate around the second rotational axis.

5. An apparatus for adjusting light beam direction according to claim 4 wherein a distance $l_1$ between the outgoing face of the first prism and the incident face of the second prism along the incident direction of the light beam and a distance $l_2$ between the outgoing face of the third prism and the incident face of the fourth prism along the incident direction of the light beam, at the zero-adjusting state are given by the following equations:

$$l_1 = \frac{-d_1 \cdot \tan \alpha}{\tan \alpha \cdot \tan \theta_2 + 1} \left( \frac{1}{\tan \beta} + \tan \theta_2 \right)$$

$$\alpha = \theta_1 - \sin^{-1}\left( \frac{\sin \theta_1}{n} \right)$$

$$\beta = \theta_2 - \sin^{-1}(n \cdot \sin(\theta_2 - \alpha))$$

$$l_2 = \frac{-d_2 \cdot \tan \gamma}{\tan \gamma \cdot \tan \theta_4 + 1} \left( \frac{1}{\tan \delta} + \tan \theta_4 \right)$$

$$\gamma = \theta_3 - \sin^{-1}\left( \frac{\sin \theta_3}{n} \right)$$

$$\delta = \theta_4 - \sin^{-1}(n \cdot \sin(\theta_4 - \gamma))$$

in which $d_1$ represents sum of thickness of the first and second prisms taken along a straight line parallel to the incident direction, $\theta_1$ is the first acute angle, $\theta_2$ is the second acute angle, $d_2$ is sum of thickness of the third and fourth prisms taken along a straight line parallel to the incident direction, $\theta_3$ is the third acute angle, $\theta_4$ is the fourth acute angle, n is the refractive index of the prisms and $\alpha$, $\beta$, $\gamma$ and $\delta$ are angles in which the angle in counterclockwise direction is defined to be positive.

6. An apparatus for adjusting light beam direction according to claim 4 wherein the first, second, third and fourth prisms have the same shapes.

7. An apparatus for adjusting light beam direction according to claim 4 wherein the first, second, third and fourth prisms are arranged, in order, along the incident direction of the light beam.

8. An apparatus for adjusting light beam direction according to claim 4 wherein the third prism is disposed between the first and the second prisms.

9. An apparatus for adjusting light beam direction comprising a first prism and second prism which have an incident face and an outgoing face non-parallel with one another and are arranged along an incident direction of the light beam, characterized in that the first prism is designed to adjustably rotate around a first rotational axis perpendicular to the incident direction;

the second prism is designed to adjustably rotate around a second rotational axis perpendicular to both the incident direction and the first rotational axis;

an incident face of the second prism is made parallel to an outgoing face of the first prism at zero-adjusting state;

an outgoing face of the second prism is made parallel to an incident face of the first prism at the zero-adjusting state; and an intersectional line of an extended incident face and an extended outgoing face of each prism is non-parallel to both the first and second rotational axes.

10. A light scanning apparatus comprising a light source; a deflecting system for deflecting the light beam emitted from the light source; a scanning lens for imaging the light beam deflected by the deflecting system on a subject to be scanned; and an apparatus for adjusting light beam direction comprising a first prism and a second prism which have an incident face and an outgoing face non-parallel with one another and are arranged along an incident direction of the light beam. wherein the first prism is designed to adjustably rotate around a first rotational axis perpendicular to the incident direction:

the second prism is designed to adjustably rotate around a second rotational axis perpendicular to both the incident direction and the first rotational axis;

an incident face of the second prism is made parallel to an outgoing face of the first prism at zero-adjusting states;

an outgoing face of the second prism is made parallel to an incident face of the first prism of the zero-adjusting state; and a virtual intersectional line of an extended incident face and an extended outgoing face of each prism is non-parallel to both the first and second rotational axes;

wherein the apparatus for adjusting light beam direction is disposed between the light source and the deflecting system, in the light path.

11. A method for manufacturing a prism comprising forming first blocks by cutting a first prismatic base material along a direction perpendicular to the longitudinal direction thereof, forming second blocks by cutting a second prismatic base material along a direction perpendicular to the longitudinal direction thereof and then joining the first block and the second block together to obtain a prism.

12. A method for manufacturing a prism according to claim 11, wherein first and second prisms are manufactured, and wherein the first and second prisms are formed by the joining to two members which are formed by cutting a triangular prism respectively.

13. An apparatus for adjusting light beam direction, said light beam originating at a light beam source and having a light beam axis, said apparatus comprising:

a first prism disposed at a first point on said light beam, said first prism having an incident face and an outgoing face, a second prism disposed at a second point on a light beam, said second point being behind said first point relative to said light beam source, said second prism having an incident face and an outgoing face, said incident face of said second prism being parallel to said outgoing face of said first prism at a zero-adjusting state, said outgoing face of said second prism being parallel to said incident face of said first prism at said zero-adjusting state; and means for rotating at lest one of said first and second prisms about an axis parallel to said light beam axis.

14. An apparatus as claimed in claim 13, wherein said incident face of said first prism is definable by rotating a vertical plane which is perpendicular to an incident direction around a rotational axis parallel to said vertical plane defined by rotating by a first acute angle, and wherein said outgoing face of said first prism is definable by rotating said vertical plane in the same direction as said first acute angle around said rotational axis by a second acute angle which is larger than said first acute angle.

15. An apparatus as claimed in claim 14, wherein, at the zero adjusting state, a distance $l_0$ between said outgoing face of said first prism and said incident face of said second prism along said incident direction of said light beam is given by the following equations:

$$l_o = \frac{-d_o \cdot \tan \alpha}{\tan \alpha \cdot \tan \theta_2 + 1} \left( \frac{1}{\tan \beta} + \tan \theta_2 \right)$$

$$\alpha = \theta_1 - \sin^{-1}\left( \frac{\sin \theta_1}{n} \right)$$

$$\beta = \theta_2 - \sin^{-1} (n \cdot \sin (\theta_2 - \alpha))$$

in the above equation, $d_0$ represents sum of thickness of said first and second prisms along a straight line parallel to said incident direction, $\theta_1$ is the first acute angle, $\theta_2$ is the second acute angle, n is refractive index of the prisms and $\alpha$ and $\beta$ are angles in which the angle in counterclockwise direction is defined to be positive.

16. An apparatus for adjusting light beam direction comprising a first prism, a second prism, a third prism and a fourth prism arranged along an incident direction of the light beam, characterized in that:

said first prism has an incident face and an outgoing face.

said second prism has an incident face and an outgoing face, said incident face of said second prism being parallel to said outgoing face of said first prism at a zero-adjusting state, said outgoing face of said second prism being parallel to said incident face of said first prism at said zero-adjusting state;

at least one of said first and second prisms is designed to adjustably rotate around a rotational axis;

said third prism has an incident face and an outgoing face;

said forth prism has an incident face and an outgoing face, said incident face of said forth prism being parallel to said outgoing face of said third prism at the zero-adjusting state, said outgoing face of said fourth prism being parallel to said incident face of said third prism at said zero-adjusting state;

at least one of said third and fourth prisms is designed to adjustably rotate around a rotational axis; and means for compensating for chromatic aberration, said means existing inherently within the interaction of said first, second, third and fourth prisms.

17. An apparatus as claimed in claim 16, wherein said incident face of said first prism is definable by rotating a vertical plane which is perpendicular to said incident direction around a first rotational axis parallel to said vertical plane by a first acute angle, wherein at least one of said first and second prisms is designed to adjustably rotate around a rotational axis parallel to said first rotational axis, and wherein said outgoing face of said first prism is defined by rotating said vertical plane in the same direction as that of said first acute angle around said first rotational axis by a second acute angle larger than said first acute angle.

18. An apparatus as claimed in claim 17, wherein said incident face of said third prism is definable by rotating a vertical plane around a second rotational axis perpendicular to both said incident direction and said first rotational axis by a third acute angle, wherein at least one of said third and fourth prisms is designed to adjustably rotate around said second rotational axis, and wherein said outgoing face of said third prism is definable by rotating a vertical plane in the same direction as that of said third acute angle around said second rotational axis by a fourth acute angle larger than said third acute angle.

* * * * *

UNITED STATES PATENT AND TRADEMARK OFFICE
CERTIFICATE OF CORRECTION

PATENT NO. : 4,850,686

DATED : July 25, 1989

INVENTOR(S) : Akira MORIMOTO et al.

It is certified that error appears in the above-identified patent and that said Letters Patent is hereby corrected as shown below:

At column 1, lines 39 and 40, change "deference" to ---difference---.

At column 1, line 42, insert ---.--- after "prism".

At column 2, line 45, change "a" to ---an--- after "assuming". At column 2, line 46, change "virtual" to ---vertical---.

At column 3, line 31, change "FIG." to ---FIGS.---.

At column 3, line 67, insert ---a--- after "is".

At column 4, line 19, change "a" to ---an--- after "by".

At column 4, line 62, delete "," after "to".

At column 6, line 11, change "$isl_o$" to ---is $l_o$---.

At column 7, line 15, delete "-" after "=" (first occurrence).

At column 7, line 26, insert ---is---after "$l_o$".

At column 7, line 56, change "he" to ---the---.

At column 8, line 59, change "views" to ---view---.

At column 8, line 66, change "3" to ---O--- after "angle".

At column 9, line 2, change "$D_2$" to ---$O_2$--- after "angle".

At column 9, line 13, delete "," after "form".

At column 10, line 1, change "$d_{21}$" to ---($d_{21}$ ---.

At column 12, line 65, change "fδ" to ---$f\theta$---.

At column 14, line 11, change "an" to ---a--- after "against".

At column 16, line 63 (i.e., in claim 10, line 2) after "source" insert ---for emitting a light beam---.

At column 17, line 2 (i.e., in claim 10, line 9), change "." to ---,--- after "beam".

At column 17, line 52 (i.e., in claim 13, line 16), change "lest" to ---least---.

UNITED STATES PATENT AND TRADEMARK OFFICE
CERTIFICATE OF CORRECTION

PATENT NO. : Akira MORIMOTO et al.

DATED : July 25, 1989

INVENTOR(S) : Akira MORIMOTO et al.

It is certified that error appears in the above-identified patent and that said Letters Patent is hereby corrected as shown below:

At column 18, line 33 (i.e., in claim 16, line 17), change "forth" to ---fourth---.

At column 18, line 34 (i.e., in claim 16, line 18), change "forth" to ---fourth---.

Signed and Sealed this

Twenty-first Day of January, 1992

Attest:

HARRY F. MANBECK, JR.

*Attesting Officer*    *Commissioner of Patents and Trademarks*